Inventor
Edward J. Stachura

June 24, 1952 E. J. STACHURA 2,601,340

FREQUENCY DISCRIMINATOR

Filed May 9, 1949 2 SHEETS—SHEET 2

Inventor

Edward J. Stachura

Patented June 24, 1952 2,601,340

UNITED STATES PATENT OFFICE 2,601,340

FREQUENCY DISCRIMINATOR

Edward J. Stachura, Arlington, Va.

Application May 9, 1949, Serial No. 92,220

8 Claims. (Cl. 250—27)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to frequency or phase selective circuits, and more particularly to novel and improved frequency discriminator circuits such as are adaptable for use with frequency modulation receivers.

One of the important objects of my invention is to provide an improved and simplified detector of angle modulated carrier waves.

Another object of my invention is to provide a frequency modulation detector circuit which is capable of responding over a wide range of frequency deviations.

Still another object of my invention is to provide a frequency modulation detector which is reliable, simple in its arrangement and construction, and economical.

Other objects, advantages and features of the invention will, of course, become apparent and at once suggest themselves to those skilled in the art to which this invention is directed.

The foregoing and other objects and features of this invention may be more readily understood by reference to the following description taken in connection with the accompanying drawings in which Figure 1 is a wiring diagram showing a bridge arrangement of a frequency discriminator in accordance with the invention.

In accordance with one embodiment of the invention, the incoming frequency modulated signal is impressed upon two corners of a bridge network which is balanced to the center frequency, $fc$, of the incoming signal. The two amplifier tubes used in the circuits illustrated have their respective grids connected to the other two corners of the bridge. A resonant circuit comprises one leg of the bridge circuit and is adjusted to have zero reactance at the center frequency. Under these conditions the bridge is balanced and the voltages on the two control grids are equal and of like sign. For frequencies below that of the center frequency ($fc$) the bridge becomes unbalanced and the voltages on the grids unequal in one direction; for frequencies above the center frequency the bridge becomes unbalanced and the voltages are again unequal but in the opposite direction. Thus if load resistors of like value are placed in each anode circuit of the amplifier tubes, it will be apparent that under conditions when the bridge is balanced, both grids have simultaneously similar instantaneous voltages applied to them, and the plate currents of the two tubes will be equal resulting in equal voltage drops across the load resistors. Further, when the bridge is unbalanced in one direction because of a higher frequency, the instantaneous voltage applied to the grids is unequal resulting in unequal plate currents. When the bridge is unbalanced in the opposite direction because of a lower frequency, the voltages on the grids are unequal in the opposite direction resulting in unequal currents producing unequal voltage drops in the load resistors. The resistor which had the higher voltage across it because of an unbalance due to a higher frequency, will have a lower voltage across it because of an unbalance at a lower frequency. By connecting a suitable output circuit across the two load resistors so that it is energized by a voltage proportional to the unbalance or difference in voltage drops in the load resistors, this difference is translated into suitable audio signals.

Figure 1:
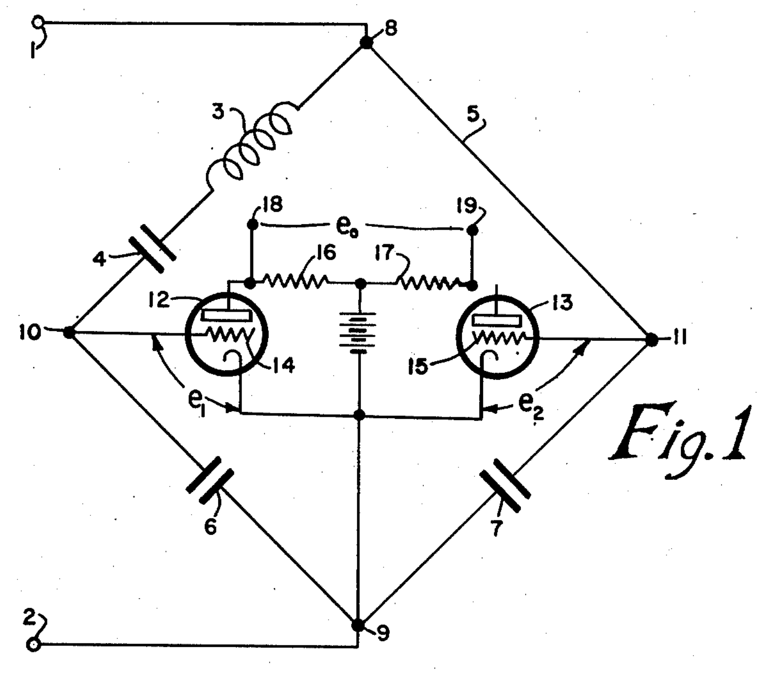

Referring now to the accompanying drawings and particularly to Figure 1, the frequency modulated signal after passing through suitable amplifying and limiting stages is applied to the input terminals land 2, from which it is fed to corners 8 and 9 of a bridge circuit. Inductance 3 and capacity element 4 comprise one arm of the bridge circuit, and in series with capacity element 6 which forms a second arm of the bridge circuit. In shunt with series elements 3, 4, and 6, is a short-circuit element 5 having substantially zero resistance comprising a third arm of the bridge and connected to capacity element 9 which is the fourth arm of the bridge circuit.

Grids 14 and 15 of amplifier tubes 12 and 13 are connected to points 10 and 11 of the bridge network. Resistors 16 and 17 are of equal value and connected in the anode circuits of tubes 12 and 13. The difference in voltage developed across resistors 16 and 17 appears at the output terminals 18 and 19.

The capacity elements 6 and 7 are preferably of equal value, and in certain situations may comprise the interelectrode capacity of the respective tubes used. Under the condition that the resistance of circuit 3, 4, and the bridge arm 5, is negligible, the bridge will be balanced at the resonant frequency ($fc$) of the series circuit 3, 4. With the bridge balanced, the voltages $e_1$ and $e_2$ on grids 14 and 15, respectively, will be of equal value and of similar polarity, and no difference of potential exists between the points 10 and 11 of the bridge. It follows that with anode resistors 16 and 17 having equal resistance, the voltage across them will be equal and, due to the manner in which they are connected, no potential difference will exist between terminals 18 and 19.

If, after the bridge is adjusted for a balanced condition at a frequency $fc$, the frequency of the input signal departs from $fc$, the bridge will become unbalanced. At input frequencies above $fc$ the circuit 3, 4 presents an inductive reactance into its arm of the bridge. This inductive reactance lowers the impedance of the series circuit 3, 4 and 6, causing an increased current to flow, resulting in an increased voltage equal to the drop across 6, to be impressed on grid 14 with respect to its cathode. If circuit elements 6 and 7 have equal capacitance, their reactances at any particular frequency will be equal, and the voltage developed across them will be proportional to the current flow through them. It follows therefore that at frequencies above resonance the drop across 6 will be greater than the drop across 7 resulting in unequal currents in the anode circuits and a voltage differential at terminals 18 and 19. At frequencies below the center frequency, $fc$, the circuit 3, 4 introduces a capacitive reactance in series with that of the capacity elements 6 which results in a smaller current through element 6 than that through capacity element 7. The bridge is then unbalanced with the instantaneous voltage on grid 15 being greater than that on grid 14 and producing a voltage differential between terminals 18 and 19 which is of opposite polarity from that which existed when the frequency of the incoming signal was higher than $fc$.

Figure 4:
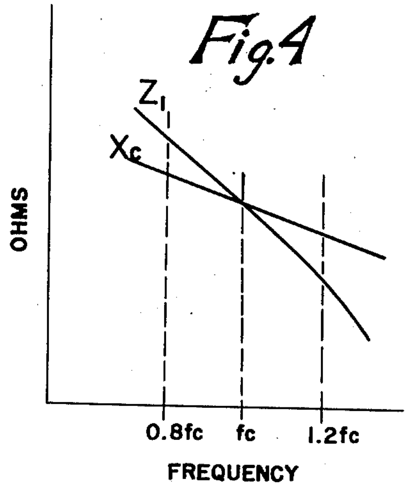
Figures 4 and 5 show graphs which are utilized through the specification to assist in explaining the operation of the circuits of Figures 1, 2, and 3.

Figure 4 shows the manner in which the scalar impedances of the two shunt paths of Figure 1 vary with frequencies above and below that of the center frequency, $fc$. The curve $Z_1$ represents the impedance of series elements 3, 4 and 6 comprising one of the shunt circuits of the bridge circuit. The curve $X_c$ represents the impedance of the capacitive elements 6 and 7 of Figure 1. Because at the resonant frequency of 3, and 4, the reactances of 3 and 4 cancel out, the impedance of that shunt path is equal to that of capacity element 6. Thus, as indicated by the curve, at a frequency, $fc$, $Z_1=X_c$. It will be observed from Figure 4 that while the reactance of capacity elements 6 and 7 varies with frequency in the manner indicated, the variation of $Z_1$ for frequencies above and below $fc$, is considerably greater. The slope of curves $X_c$ and $Z_1$ will of course depend upon the values of 3, 4, 6 and 7. For the particular case illustrated, the values of 3, 4, 6 and 7 were selected which gave like reactances at the frequency, $fc$.

It will be readily understood that various circuit combinations may be used in the place of series circuit 3, 4. For very sharp responses a piezoelectric crystal, adjusted to its series resonant condition could be employed.

Figure 5:
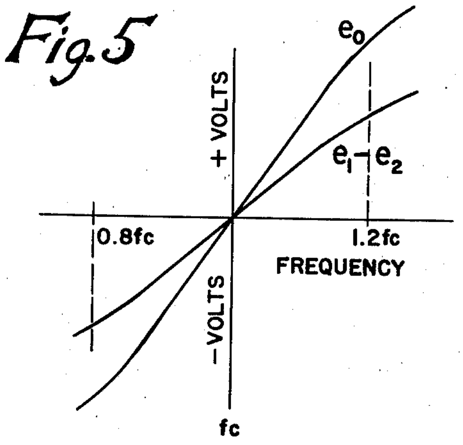

Figure 5 shows a curve $e_1—e_2$ which represents the amount of unbalance between points 10 and 11, respectively, of the bridge network for a range of frequency deviations above and below the balancing frequency, $fc$. The effect of $e_1—e_2$ is amplified by the action of tubes 12 and 13 and appears as a voltage between terminals 18 and 19. Curve $e_0$ in Figure 5 shows the manner in which the output voltage varies with variation in the frequency of the input signal.

The slope of $e_0$ is substantially linear with frequency for a wide range of frequency departures. Actually $e_0$ would continue to increase for frequency deviations above $fc$ until a second resonant condition occurs beyond which the curve would have a negative slope. This second resonant condition is determined by the values of 3, 4 and 6. When 4 and 6 are of equal value, the second resonant frequency occurs at approximately 1.4 times the frequency, $fc$, the first resonant frequency of the bridge network. It will be apparent to those skilled in the art that the slope of $e_0$ can be altered through the use of different combinations of values for the circuit elements 3, 4 and 6.

Figure 2:
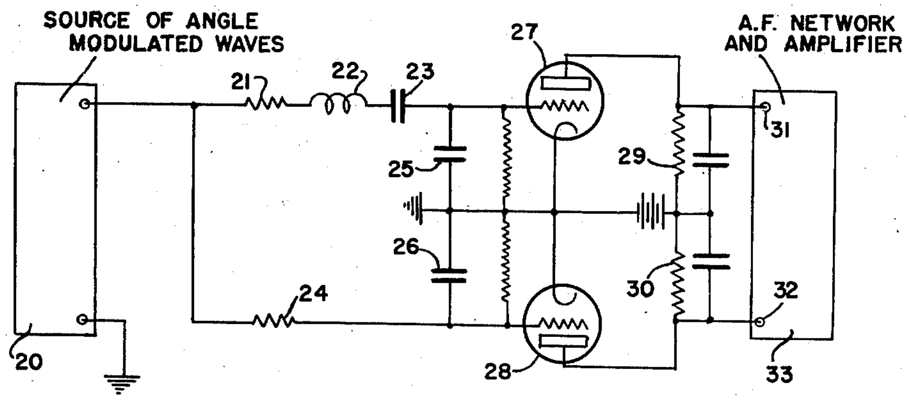
Figure 2 represents a practical modification of the basic circuit illustrated in Figure 1.

Figure 2 is a practical modification of the basic circuit illustrated in Figure 1. Reference numeral 21 represents the loss resistance of series circuit 22, 23 which form one arm of the bridge. It is desirable that very low-loss circuits (high Q) be used in this arm of the bridge. Numeral 24 is a non-reactive resistor equal in value to the loss resistance 21. Capacity elements 25 and 26 may, in certain applications comprise the grid-to-cathode interelectrode capacitance of tubes 27 and 28 respectively. Connected in the anode circuits of tubes 27 and 28 are load impedances 29 and 30, respectively. Connected across impedances 29 and 30 is a voltage utilization circuit 33 which may comprise an audio frequency network and amplifier. Reference numeral 20 represents a source of angle-modulated waves.

From the discussion of the operation of the circuit of Figure 1 it will be apparent that the circuit will be adjusted to a balanced condition when the series circuit 22, 23 is tuned to resonance at the reference frequency, $fc$, of the incoming waves. At frequencies above and below this reference frequency, the bridge becomes unbalanced. There will be developed across each of the resistors 29 and 30 respective voltages produced by the anode currents. Since resistors 29 and 30 are of equal value and connected so that the developed voltages will be in polarity opposition, it follows that at a frequency, $fc$, when the bridge is balanced, the voltage differential across the output circuit 33 will be zero; at other frequencies the bridge becomes unbalanced and a direct current potential will be developed across the output circuit 33, whose magnitude and polarity are determined by the amount and direction of frequency deviation from $fc$.

Figure 3:
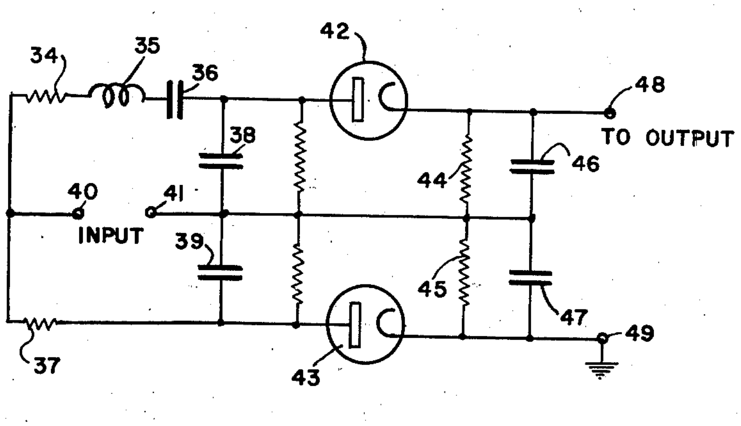
Figure 3 illustrates an embodiment of the invention.

Figure 3 is a circuit diagram representing an additional modified form of the invention in which diode type rectifier tubes 42 and 43 are used in the place of the triodes of Figures 1 and 2. The diodes 42 and 43, respectively, have individual load impedances 44 and 45, respectively, serially connected therewith. Capacity elements 38 and 39 form two arms of a bridge circuit in accordance with this invention. A third arm includes loss-resistance 34, and series circuit 35, 36. The fourth arm of the bridge being the resistance element 37 which is made equal to the loss resistance 34. The input is applied to terminals 40, 41. The circuit is adjusted for a balanced condition at a reference frequency, *fc*. Variations in frequency above or below *fc* will unbalance the bridge and produce a voltage differential between terminals 48 and 49 to which may be connected a suitable utilization circuit.

While the foregoing discussion was concerned with FM signals it will be apparent to those skilled in the art that the discriminator of the present invention may also be used in connection with phase modulated signals. The generic term "angle modulated wave" is frequently used to include frequency modulated (FM), phase modulated (PM), or hybrid forms of these. As is well known, FM waves are produced by varying the carrier frequency about a mean frequency by an amount proportionally to the amplitude of the audio modulating signal. A PM wave differs from FM in that its frequency deviation increases with the modulating frequency. It follows from this that since in both FM and PM the frequency of the carrier undergoes excursions during modulation that the present invention may be used in circuits for the detection of these forms of modulation. Appropriate networks in the audio frequency amplifier provides the necessary corrections, such as de-emphasis, for deriving a signal representative of the modulating wave.

While I have shown and discussed certain embodiments of the invention, other modifications will be apparent and at once suggest themselves to those skilled in the art, without departing from the spirit and scope of my invention.

I claim:

1. A frequency responsive network for operation over a wide range of frequency deviations comprising a source of variable frequency signals, said signals having a reference frequency about which the frequency varies, a bridge network having four arms and two pairs of diagonally opposite terminals, and means responsive to difference of potential; one arm of said bridge including a resonant circuit comprising a inductance and capacitance in series connection tuned to series resonance at said reference frequency, said source of variable frequency signals being applied to one pair of said diagonally opposite terminals, and said means responsive connected to said other pair of diagonally opposite terminals, whereby at said reference frequency the bridge is balanced, and at the other frequencies the bridge is unbalanced producing a potential difference across said means responsive.

2. A frequency discriminator circuit comprising in combination a four arm bridge network and having diagonally opposite input terminals to which frequency modulated signals are applied, said signals varying about a center frequency, and diagonally opposite output terminals to which is connected a potential responsive utilization circuit; one arm of said bridge includes a circuit series resonant at the center frequency of said signals at which frequency said bridge is balanced and equal and in-phase potentials are applied to said utilization circuit, and at frequencies other than the center frequency a potential difference is developed across said utilization circuit, said potential difference being of one polarity for frequencies which are above said center frequency, and of opposite polarity for frequencies below said center frequency.

3. A frequency discriminator according to claim 2 in which said potential responsive means includes a pair of thermionic tubes each having an output element and at least a signal actuated control electrode, said control electrodes being connected to said output terminals of said bridge network.

4. A frequency discriminator according to claim 2 in which said potential responsive means includes a pair of rectifier devices each having anode terminals connected to said output terminals of said bridge, and cathode terminals connected differentially by a pair of impedances, and means for utilizing the voltage difference developed across said impedance elements.

5. In a frequency discriminator, a source of frequency modulated input signals having a center frequency, a pair of electron tubes each having at least an anode, a cathode, and a control grid, an impedance network between one terminal of said source and one of said grids, said network having zero reactance at said center frequency, an inductive reactance at a higher frequency and a capacitive reactance at a lower frequency, non-reactance means connecting said other grid to said one terminal, equal capacity elements between the grids and cathodes of said tubes; differentially connected impedance means in the anode circuits of said tubes; and output utilization means connected to said impedance means and responsive to the voltage difference developed therein.

6. In combination, a frequency modulation detector circuit utilizing a pair of amplifier tubes each having at least a cathode, a control grid and an anode; a source of frequency modulated input signals having a reference frequency, said source having a first and second terminal, said second terminal being connected to the cathodes of said amplifier tubes; equal capacity elements between the grids and cathodes of said tubes; a frequency responsive means having a low resistive component connected between said first terminal and one of the grids, said responsive means being adjustable to a series resonant condition at said reference frequency; a non-reactive resistive means connected between said first terminal and the other of said grids; load impedance means in each anode circuit of said tubes connected in phase opposition; and voltage responsive output means connected across said impedances; whereby, at the reference frequency of said input signals the frequency responsive means becomes non-reactive causing like voltages to appear across said capacity elements resulting in a zero voltage across said output means, and at other frequencies the freqeuncy responsive means introduces a reactance between said first terminal and said first one of said grids resulting in unlike voltages across the capacity elements and producing a differential voltage across said output circuit.

7. A frequency discriminator circuit comprising in combination a four arm bridge network having diagonally opposite input terminals to which frequency modulated signals are applied, said signals having a center freqeuncy about which frequency variations take place, and diagonally opposite output terminals; one arm of said bridge comprising electrical means adjusted for series resonance at said center frequency of said signals at which frequency the birdge is balanced; a pair of electron tubes each having at least a cathode, a control grid and an anode; differentially connected impedance means in the anode circuits of said tubes; means for connecting the grids across the output terminals of said bridge, whereby when said bridge is balanced, equal and in phase voltages are applied to said grids, and no difference of potential appears across said differentially connected impedance means.

8. A frequency discriminator in accordance with claim 5 wherein said capacity elements comprise the grid-to-cathode interelectrode capacitance of said tubes.

EDWARD J. STACHURA.

REFERENCES CITED

The following references are of record in the file of this patent:

UNITED STATES PATENTS

| Number | Name | Date |
|---|---|---|
| 1,715,561 | Mohr | June 4, 1929 |
| 1,941,068 | Armstrong | Dec. 26, 1933 |
| 2,022,790 | Sturdy | Dec. 3, 1935 |
| 2,312,070 | Bliss | Feb. 23, 1943 |
| 2,422,513 | Yeandle | June 17, 1947 |